(12) United States Patent
Kim

(10) Patent No.: US 11,084,925 B2
(45) Date of Patent: Aug. 10, 2021

(54) THERMALLY CONDUCTIVE POLYMER COMPOSITION

(71) Applicant: Ticona LLC, Florence, KY (US)

(72) Inventor: Young Shin Kim, Cincinnati, OH (US)

(73) Assignee: Ticona LLC, Florence, KY (US)

(*) Notice: Subject to any disclaimer, the term of this patent is extended or adjusted under 35 U.S.C. 154(b) by 0 days.

(21) Appl. No.: 16/274,348

(22) Filed: Feb. 13, 2019

(65) Prior Publication Data

US 2019/0256703 A1 Aug. 22, 2019

Related U.S. Application Data

(60) Provisional application No. 62/632,612, filed on Feb. 20, 2018.

(51) Int. Cl.
| | | |
|---|---|---|
| *C09K 5/08* | (2006.01) | |
| *C08L 67/02* | (2006.01) | |
| *C08K 3/34* | (2006.01) | |
| *C08L 81/02* | (2006.01) | |
| *C08K 7/10* | (2006.01) | |
| *C08K 7/14* | (2006.01) | |
| *F21V 29/74* | (2015.01) | |
| *F21V 29/87* | (2015.01) | |
| *F21S 43/14* | (2018.01) | |
| *F21S 45/48* | (2018.01) | |
| *C08K 5/00* | (2006.01) | |

(52) U.S. Cl.
CPC ............ *C08L 67/02* (2013.01); *C08K 3/34* (2013.01); *C08K 5/0083* (2013.01); *C08K 7/10* (2013.01); *C08K 7/14* (2013.01); *C08L 81/02* (2013.01); *C09K 5/08* (2013.01); *F21S 43/14* (2018.01); *F21S 45/48* (2018.01); *F21V 29/74* (2015.01); *F21V 29/87* (2015.01); *C08K 2201/001* (2013.01); *C08L 2205/24* (2013.01)

(58) Field of Classification Search
None
See application file for complete search history.

(56) References Cited

U.S. PATENT DOCUMENTS

| | | |
|---|---|---|
| 5,021,497 A | 6/1991 | Ohara et al. |
| 5,030,680 A | 7/1991 | Wilder et al. |
| 5,068,274 A | 11/1991 | Efner |

(Continued)

FOREIGN PATENT DOCUMENTS

| | | |
|---|---|---|
| CN | 101305056 A | 11/2008 |
| CN | 104040422 A | 9/2014 |

(Continued)

OTHER PUBLICATIONS

Chen et al., "Recent research developments in polymer heat exchangers—A review," *Renewable and Sustainable Energy Reviews* 60, 2016, pp. 1367-1386.

(Continued)

*Primary Examiner* — Courtney L Smith
(74) *Attorney, Agent, or Firm* — Dority & Manning, P.A.

(57) ABSTRACT

A polymer composition comprising a polymer matrix within which a plurality of flake-shaped mineral particles and mineral whiskers are distributed is provided. The polymer composition exhibits an in-plane thermal conductivity of about 0.2 W/m-K or more as determined in accordance with ASTM E 1461-13.

30 Claims, 1 Drawing Sheet

(56) References Cited

U.S. PATENT DOCUMENTS

| | | | |
|---|---|---|---|
| 5,508,374 A | 4/1996 | Lee et al. | |
| 5,830,940 A | 11/1998 | Nakamura et al. | |
| 6,221,962 B1 | 4/2001 | Heino et al. | |
| 6,560,840 B1 | 5/2003 | Jenkins et al. | |
| 6,730,378 B2 | 5/2004 | Matsuoka et al. | |
| 6,730,731 B2 | 5/2004 | Tobita et al. | |
| 7,304,107 B2 | 12/2007 | Alms et al. | |
| 7,445,797 B2 | 11/2008 | Meneghetti et al. | |
| 7,608,666 B2 | 10/2009 | Matsuoka et al. | |
| 7,612,130 B2 | 11/2009 | Kim | |
| 7,648,748 B2 | 1/2010 | Nakane et al. | |
| 7,776,410 B2 | 8/2010 | Nakane et al. | |
| 7,960,473 B2 | 6/2011 | Kobayashi et al. | |
| 8,324,307 B2 | 12/2012 | Harder et al. | |
| 8,646,994 B2 | 2/2014 | Kim et al. | |
| 8,658,057 B2 | 2/2014 | Nakayama et al. | |
| 8,741,998 B2 | 6/2014 | l'Abee et al. | |
| 8,796,397 B2 | 8/2014 | Luo et al. | |
| 8,834,741 B2 | 9/2014 | Shiraishi et al. | |
| 8,852,487 B2 | 10/2014 | Feng et al. | |
| 8,906,259 B2 | 12/2014 | Kim | |
| 8,926,862 B2 | 1/2015 | Kim et al. | |
| 8,932,483 B2 | 1/2015 | Kim | |
| 8,946,333 B2 | 2/2015 | Raman et al. | |
| 9,074,070 B2 | 7/2015 | Yung et al. | |
| 9,080,036 B2 | 7/2015 | Luo et al. | |
| 9,090,751 B2 | 7/2015 | Saga et al. | |
| 9,119,307 B2 | 8/2015 | Luo et al. | |
| 9,127,142 B2 | 9/2015 | Luo et al. | |
| 9,284,435 B2 | 3/2016 | Kim | |
| 9,355,753 B2 | 5/2016 | Kim | |
| 9,512,293 B2 | 12/2016 | Kim | |
| 9,512,312 B2 | 12/2016 | Mazahir et al. | |
| 9,777,151 B2 | 10/2017 | Sohn et al. | |
| 9,822,254 B2 | 11/2017 | Kim | |
| 9,862,809 B2 | 1/2018 | Kim et al. | |
| 9,896,566 B2 | 2/2018 | Yung et al. | |
| 9,988,519 B2 | 6/2018 | Kim | |
| 10,011,715 B2 | 7/2018 | Washio et al. | |
| 10,106,682 B2 | 10/2018 | Kim | |
| 10,233,304 B2 | 3/2019 | Feng | |
| 10,280,282 B2 | 5/2019 | Kim | |
| 10,287,421 B2 | 5/2019 | Kim | |
| 10,544,342 B2* | 1/2020 | Ezaki | C09K 5/14 |
| 10,941,275 B2 | 3/2021 | Kim | |
| 2002/0172786 A1 | 11/2002 | Matsuoka et al. | |
| 2003/0096070 A1 | 5/2003 | Matsuoka et al. | |
| 2005/0186438 A1 | 8/2005 | Alms et al. | |
| 2007/0182059 A1 | 8/2007 | Ikegawa et al. | |
| 2010/0283001 A1* | 11/2010 | Pot | C08J 3/20 252/74 |
| 2010/0297453 A1 | 11/2010 | Maenaka et al. | |
| 2012/0232188 A1 | 9/2012 | Nakayama | |
| 2013/0098666 A1 | 4/2013 | Lee | |
| 2013/0119317 A1 | 5/2013 | Kim et al. | |
| 2013/0123420 A1 | 5/2013 | Kim | |
| 2013/0146344 A1 | 6/2013 | Lee et al. | |
| 2013/0157780 A1 | 6/2013 | Kim et al. | |
| 2014/0004328 A1 | 1/2014 | Kim et al. | |
| 2014/0080952 A1* | 3/2014 | Raman | B29B 7/421 524/265 |
| 2014/0154479 A1 | 6/2014 | Yun et al. | |
| 2014/0171575 A1 | 6/2014 | Mercx et al. | |
| 2014/0264183 A1 | 9/2014 | Kim | |
| 2015/0104165 A1 | 4/2015 | Kim | |
| 2015/0112019 A1 | 4/2015 | Kim et al. | |
| 2015/0175805 A1 | 6/2015 | Schaefer | |
| 2015/0184055 A1* | 7/2015 | Raman | B29B 7/489 252/71 |
| 2015/0225547 A1 | 8/2015 | Tu et al. | |
| 2015/0275063 A1* | 10/2015 | Raman | B29C 48/565 252/75 |
| 2016/0053107 A1 | 2/2016 | Mazahir et al. | |
| 2016/0053117 A1 | 2/2016 | Nair et al. | |
| 2016/0053118 A1 | 2/2016 | Nair et al. | |
| 2016/0152801 A1 | 6/2016 | Yu et al. | |
| 2017/0029682 A1 | 2/2017 | Kim et al. | |
| 2017/0101530 A1* | 4/2017 | Zheng | C08L 69/00 |
| 2017/0183475 A1* | 6/2017 | Zhang | C08K 3/016 |
| 2017/0317257 A1 | 11/2017 | Ezald et al. | |
| 2018/0037790 A1 | 2/2018 | Kim | |
| 2018/0066135 A1* | 3/2018 | Zhang | C08K 5/49 |
| 2018/0194982 A1* | 7/2018 | Ezaki | C08K 3/042 |
| 2018/0212208 A1 | 7/2018 | Kim | |
| 2018/0223096 A1 | 8/2018 | Kim | |
| 2019/0040937 A1 | 2/2019 | Van Ruiten et al. | |
| 2019/0161612 A1 | 5/2019 | Kim | |
| 2019/0309205 A1* | 10/2019 | Guo | C09K 5/14 |
| 2019/0322836 A1* | 10/2019 | Gilles | C08K 3/04 |
| 2021/0071082 A1 | 3/2021 | Hara et al. | |

FOREIGN PATENT DOCUMENTS

| | | |
|---|---|---|
| CN | 104341721 A | 2/2015 |
| CN | 106633678 A | 5/2017 |
| EP | 1 703 234 A2 | 9/2006 |
| JP | H08134334 A | 5/1996 |
| JP | 2000080289 A | 3/2000 |
| JP | 2000313798 A | 11/2000 |
| JP | 2000313812 A | 11/2000 |
| JP | 2005187809 A | 7/2005 |
| JP | 2006089701 A | 4/2006 |
| JP | 20061117731 A | 5/2006 |
| JP | 2006347151 A | 12/2006 |
| JP | 2007211211 A | 8/2007 |
| JP | 2007238851 A | 9/2007 |
| JP | 2007254716 A | 10/2007 |
| JP | 2007254717 A | 10/2007 |
| JP | 2007277292 A | 10/2007 |
| JP | 4600015 B | 12/2010 |
| JP | 4600016 B | 12/2010 |
| JP | 4625304 B | 2/2011 |
| JP | 2011137064 A | 7/2011 |
| JP | 2012251130 A | 12/2012 |
| JP | 2013014781 A | 1/2013 |
| JP | 2015000949 A | 1/2015 |
| JP | 201521110 A | 2/2015 |
| JP | 6022127 B1 | 11/2016 |
| JP | 6359225 B2 | 7/2018 |
| JP | 6470295 B2 | 2/2019 |
| TW | 201522578 A | 6/2015 |
| TW | 201738314 A | 11/2017 |
| WO | WO 95/15360 A1 | 6/1995 |
| WO | WO 2007/043701 A1 | 4/2007 |
| WO | WO 2013/129338 A1 | 6/2013 |
| WO | WO 2013/169325 A1 | 11/2013 |
| WO | WO 2014/087842 A1 | 6/2014 |
| WO | WO 2017/023662 A1 | 2/2017 |
| WO | WO 2017/038421 A1 | 7/2018 |

OTHER PUBLICATIONS

Gray, et al., "Thermal conductivity of mica at low temperatures," *Journal of Materials Science 12*, 1977, pp. 959-965.

Müller et al., "Biodegradation of polyesters containing aromatic constituents," *Journal of Biotechnology 86*, 2001, pp. 87-95.

International Search Report and Written Opinion for PCT/US2019/017846 dated May 6, 2019, 15 pages.

Material Property Data for DuPont Elvaloy® PTW Ethylene/N-Butyl Acrylate/Glycidyl Methacrylate Copolymer from E. I. du Pont de Nemours and Company, Inc., Aug. 10, 2015, 2 pages.

Material Safety Data Sheet on LOTADER® AX8840 from Arkema, Jul. 11, 2011, 8 pages.

Product Bulletin for Boron Nitride Powder from Momentive, Sep. 2012, 2 pages.

Product Bulletin for PolarTherm* Boron Nitride Powder from Momentive, Sep. 2012, 2 pages.

Product Data Sheet for Elvaloy® resins from E. I. du Pont de Nemours and Company, Inc., Jun. 8, 2015, 3 pages.

(56) References Cited

OTHER PUBLICATIONS

Product Information on LOTADER® AX8840 from Arkema, Apr. 2014, 2 pages.

* cited by examiner

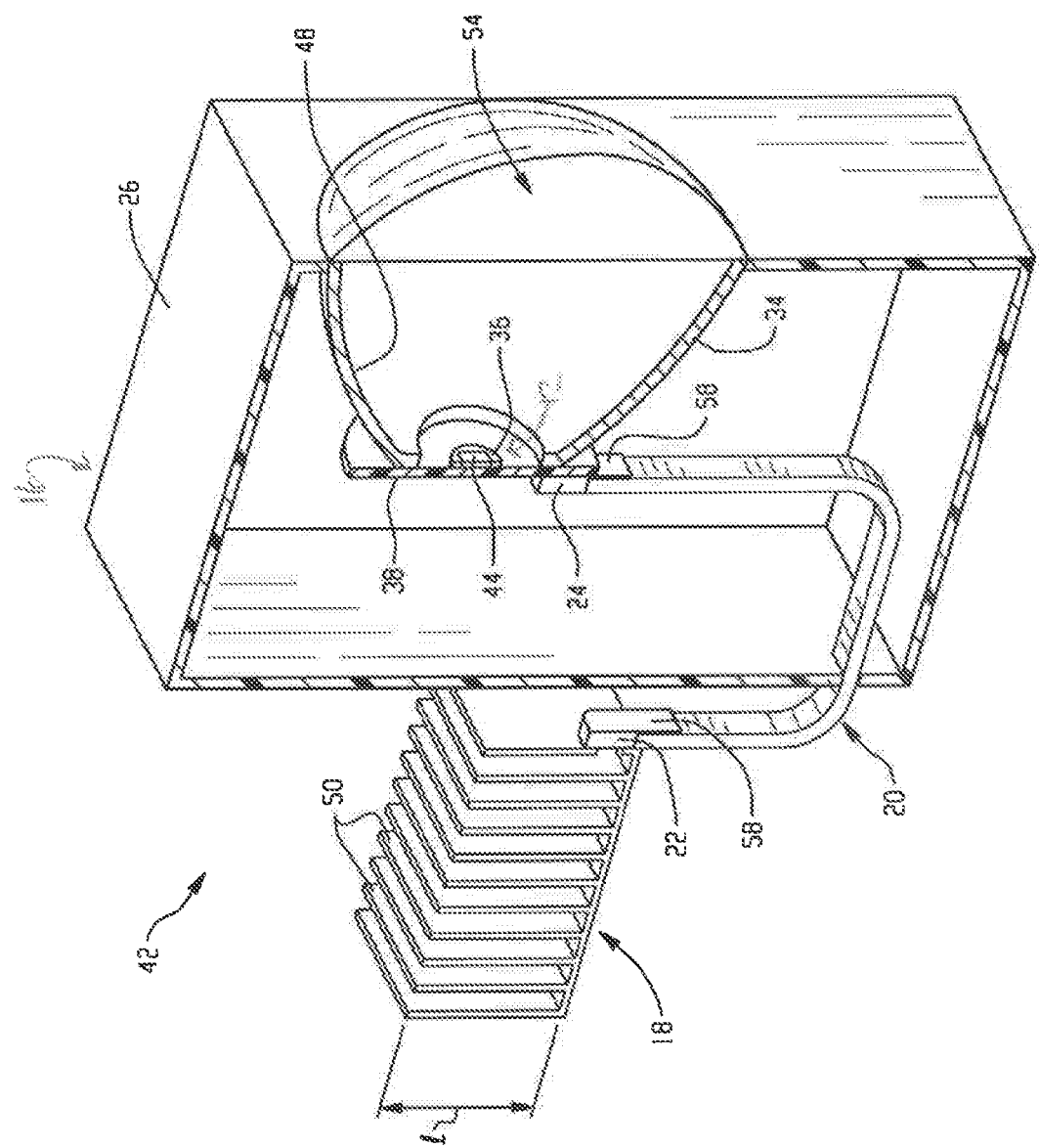

THERMALLY CONDUCTIVE POLYMER COMPOSITION

RELATED APPLICATION

The present application claims priority to U.S. Application Ser. No. 62/632,612 (filed on Feb. 20, 2018), which is incorporated herein in its entirety by reference thereto.

BACKGROUND OF THE INVENTION

Metallic materials are commonly employed in thermally conductive heat sinks to dissipate heat, such as in semiconductor packaging, headlamps, etc. In these applications, the metallic material is typically tooled or machined from a bulk metal into the desired configuration. Unfortunately, however, the geometries that can be formed from metal articles are very limited to the inherent limitations associated with the machining or tooling process. This places severe limitations on the efficiency of the heat sink design. Various attempts have thus been made to use thermally conductive polymer compositions to form the heat sinks. While successful in some circumstances, polymer compositions having a high thermal conductivity value tend to have relatively poor structural integrity and strength, and conversely, compositions having a high degree of structural integrity and strength tend to have a relatively low thermal conductivity value. Thus, it has been traditionally difficult to use thermally conductive polymer compositions in applications that require a high degree of strength and integrity, such as in exterior automotive applications (e.g., headlamps) and industrial applications. As such, a need currently exists for a thermally conductive polymer composition having a high thermal conductivity and good structural integrity.

SUMMARY OF THE INVENTION

In accordance with one embodiment of the present invention, a polymer composition is disclosed that comprises a polymer matrix within which a plurality of flake-shaped mineral particles and mineral whiskers are distributed. The polymer composition exhibits an in-plane thermal conductivity of about 0.2 W/m-K or more as determined in accordance with ASTM E 1461-13.

Other features and aspects of the present invention are set forth in greater detail below.

BRIEF DESCRIPTION OF THE FIGURE

A full and enabling disclosure of the present invention, including the best mode thereof to one skilled in the art, is set forth more particularly in the remainder of the specification, including reference to the accompanying FIGURE, in which:

FIG. 1 is a perspective view of one embodiment of a heat sink that may be formed accordance with the present invention, shown in this embodiment as being attached to a light assembly.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that contains a combination of mineral fibers ("whiskers") and flaked-shaped mineral particles. By selectively controlling the specific nature of these and other components of the polymer composition along with their relative concentration, the present inventor has discovered that resulting composition can achieve a high degree of thermal conductivity, which allow the composition to be capable of creating a thermal pathway for heat transfer away from certain parts (e.g., LED module) so that "hot spots" can be quickly eliminated and the overall temperature can be lowered during use. The composition may, for example, exhibit an in-plane thermal conductivity of about 0.2 W/m-K or more, in some embodiments about 0.5 W/m-K or more, in some embodiments about 0.6 W/m-K or more, in some embodiments about 0.8 W/m-K or more, and in some embodiments, from about 1 to about 3.5 W/m-K, as determined in accordance with ASTM E 1461-13. The composition may also exhibit a through-plane thermal conductivity of about 0.3 W/m-K or more, in some embodiments about 0.5 W/m-K or more, in some embodiments about 0.40 W/m-K or more, and in some embodiments, from about 0.7 to about 2 W/m-K, as determined in accordance with ASTM E 1461-13.

Notably, it has been surprisingly discovered that such a thermal conductivity can be achieved without use of conventional materials having a high degree of intrinsic thermal conductivity. For example, the polymer composition may be generally free of fillers having an intrinsic thermal conductivity of 50 W/m-K or more, in some embodiments 100 W/m-K or more, and in some embodiments, 150 W/m-K or more. Examples of such high intrinsic thermally conductive materials may include, for instance, boron nitride, aluminum nitride, magnesium silicon nitride, graphite (e.g., expanded graphite), silicon carbide, carbon nanotubes, zinc oxide, magnesium oxide, beryllium oxide, zirconium oxide, yttrium oxide, aluminum powder, and copper powder. While it is normally desired to minimize the presence of such high intrinsic thermally conductive materials, they may nevertheless be present in a relatively small percentage in certain embodiments, such as in an amount of about 10 wt. % or less, in some embodiments about 5 wt. % or less, and in some embodiments, from about 0.01 wt. % to about 2 wt. % of the polymer composition.

Furthermore, it was conventionally believed that compositions with a high thermal conductivity could not also possess sufficiently good mechanical properties. Contrary to conventional thought, however, the present inventor has discovered that through careful control over the particular materials employed (e.g., nature of polymer matrix, flaked-shaped mineral particles, mineral fibers, etc.) and the manner in which they are processed, parts can be formed from the polymer composition that still possess excellent mechanical properties. For example, the composition may exhibit a Charpy unnotched impact strength greater than about 5 kJ/m$^2$, in some embodiments from about 10 to about 50 kJ/m$^2$, and in some embodiments, from about 15 to about 30 kJ/m$^2$, measured at 23° C. according to ISO Test No. 179-1:2010 (technically equivalent to ASTM D256-10e1). The composition may also exhibit a Charpy notched impact strength greater than about 0.5 kJ/m$^2$, in some embodiments from about 1 to about 20 kJ/m$^2$, and in some embodiments, from about 2 to about 10 kJ/m$^2$, measured at 23° C. according to ISO Test No. 179-1:2010 (technically equivalent to ASTM D256-10e1). The tensile and flexural mechanical properties may also be good. For example, the composition may exhibit a tensile strength of from about 30 to about 300 MPa, in some embodiments from about 60 to about 200 MPa, and in some embodiments, from about 90 to about 150 MPa; a tensile break strain of about 0.3% or more, in some embodiments from about 0.4% to about 3%, and in some embodiments, from about 0.5% to about 2%; and/or a tensile modulus of from about 10,000 MPa to about 40,000 MPa, in some embodiments from about 15,000 MPa to about 35,000 MPa, and in some embodiments, from about 18,000 MPa to about 30,000 MPa. The tensile properties may be determined in accordance with ISO Test No. 527-1:2012 (technically equivalent to ASTM D638-14) at 23° C. The polymer composition may also exhibit a flexural strength of from about 30 MPa to about 500 MPa, in some embodiments from about 80 MPa to about 500 MPa, in some embodiments from about 120 MPa to about 400 MPa, and in some embodiments, from about 130 MPa to about 250 MPa; a flexural break strain of about 0.5% or more, in some embodiments from about 0.6% to about 5%, and in some embodiments, from about 0.7% to about 2.5%; and/or a flexural modulus of from about 7,000 MPa to about 40,000 MPa, in some embodiments from about 10,000 MPa to about 40,000 MPa, in some embodiments from about 15,000 MPa to about 35,000 MPa, and in some embodiments, from about 18,000 MPa to about 30,000 MPa. The flexural properties may be determined in accordance with ISO Test No. 178:2010 (technically equivalent to ASTM D790-15e2) at 23° C. The polymer composition may also exhibit a deflection temperature under load (DTUL) of about 160° C. or more, and in some embodiments, from about 180° C. to about 240° C., as determined in accordance with ISO 75-2:2013 (technically equivalent to ASTM D648-07) at a specified load of 1.8 MPa. The specific gravity of the polymer composition may also be relatively low, such as about 2.5 g/cm$^3$ or less, in some embodiments about 2 g/cm$^3$ or less, and in some embodiments, from about 1.2 to about 1.9 g/cm$^3$, as determined in accordance with ISO 1183-1: 2012.

The present inventor has discovered that the ability to achieve a polymer composition with such a unique combination of properties can be achieved through selective control over the nature of the components employed in the composition, and their relative concentration. For example, the mineral whiskers are typically employed in an amount of from about 60 to about 350 parts, in some embodiments from about 80 parts to about 300 parts, and in some embodiments from about 100 to about 250 parts by weight per 100 parts by weight of the polymer matrix employed in the composition. Likewise, flaked-shaped mineral particles are typically employed in an amount less than the mineral whiskers, such as from about 1 to about 60 parts, in some embodiments from about 5 parts to about 50 parts, and in some embodiments, from about 10 to about 40 parts by weight per 100 parts by weight of the polymer matrix employed in the composition. For example, the mineral whiskers may constitute from about 20 wt. % to about 70 wt. %, in some embodiments from about 25 wt. % to about 65 wt. %, and in some embodiments, from about 30 wt. % to about 60 wt. % of the polymer composition, while the flaked-shaped mineral particles may constitute from about from about 1 wt. % to about 20 wt. %, in some embodiments from about 2 wt. % to about 18 wt. %, and in some embodiments, from about 5 wt. % to about 15 wt. % of the polymer composition.

Various embodiments of the present invention will now be described in more detail.

I. Polymer Composition

A. Polymer Matrix

The polymer matrix typically constitutes from about 10 wt. % to about 50 wt. %, in some embodiments from about 15 wt. % to about 45 wt. %, and in some embodiments, from about 20 wt. % to about 40 wt. % of the composition. Any of a variety of polymers or combinations of polymers may generally be employed in the polymer matrix. Suitable polymers may include, for instance, polyolefins (e.g., ethylene polymers, propylene polymers, etc.), polyamides (e.g., aliphatic, semi-aromatic, or aromatic polyamides), polyesters, polyarylene sulfides, polyetherimides, polyacetals (e.g., polyoxymethylene), polyphenylene oxides, polyarylketones (e.g., polyetheretherketone, polyetherketoneketone, etc.), polycarbonates, etc., as well as blends thereof.

Aromatic polymers are particularly suitable as such polymers are generally considered "high performance" polymers that they have a relatively high glass transition temperature and/or high melting temperature. Such high performance aromatic polymers can thus provide a substantial degree of heat resistance to the resulting polymer composition. For example, the aromatic polymer may have a glass transition temperature of about 40° C. or more, in some embodiments about 50° C. or more, and in some embodiments, from about 60° C. to about 320° C. The aromatic polymer may also have a melting temperature of about 200° C. or more, in some embodiments from about 210° C. to about 400° C., and in some embodiments, from about 220° C. to about 380° C. The glass transition and melting temperatures may be determined as is well known in the art using differential scanning calorimetry ("DSC"), such as determined by ISO Test No. 11357-2:2013 (glass transition) and 11357-3:2011 (melting).

One example of a suitable semi-crystalline aromatic polymer, for instance, is an aromatic polyester that is a condensation product of an aromatic dicarboxylic acid having 8 to 14 carbon atoms and at least one diol. Suitable diols may include, for instance, neopentyl glycol, cyclohexanedimethanol, 2,2-dimethyl-1,3-propane diol and aliphatic glycols of the formula $HO(CH_2)_nOH$ where n is an integer of 2 to 10. Suitable aromatic dicarboxylic acids may include, for instance, isophthalic acid, terephthalic acid, 1,2-di(p-carboxyphenyl)ethane, 4,4'-dicarboxydiphenyl ether, etc., as well as combinations thereof. Fused rings can also be present such as in 1,4- or 1,5- or 2,6-naphthalene-dicarboxylic acids. Particular examples of such aromatic polyesters may include, for instance, poly(ethylene terephthalate) (PET), poly(1,4-butylene terephthalate) (PBT), poly(1,3-propylene terephthalate) (PPT), poly(1,4-butylene 2,6-naphthalate) (PBN), poly(ethylene 2,6-naphthalate) (PEN), poly (1,4-cyclohexylene dimethylene terephthalate) (PCT), and copolymers and mixtures of the foregoing.

In addition, modified or copolymers of polyethylene terephthalate polymers and/or polybutylene terephthalate polymers may also be used. For instance, in one embodiment, a modifying acid or a modifying diol may be used to produce modified polyethylene terephthalate polymers and/ or modified polybutylene terephthalate polymers. As used herein, the terms "modifying acid" and "modifying diol" are meant to define compounds, which can form part of the acid and diol repeat units of a polyester, respectively, and which can modify a polyester to reduce its crystallinity or render the polyester amorphous. Of course, the polyesters may be non-modified and do not contain a modifying acid or a modifying diol. In any event, examples of modifying acid components may include, but are not limited to, isophthalic acid, phthalic acid, 1,3-cyclohexanedicarboxylic acid, 1,4-cyclohexane dicarboxylic acid, 2,6-naphthaline dicarboxylic acid, succinic acid, glutaric acid, adipic acid, sebacic acid, suberic acid, 1,12-dodecanedioic acid, etc. In practice, it is often preferable to use a functional acid derivative thereof such as the dimethyl, diethyl, or dipropyl ester of the dicarboxylic acid. The anhydrides or acid halides of these acids also may be employed where practical. Examples of modifying diol components may include, but are not limited to, neopentyl glycol, 1,4-cyclohexanedimethanol, 1,2-propanediol, 1,3-propanediol, 2-methy-1,3-propanediol, 1,4-butanediol, 1,6-hexanediol, 1,2-cyclohexanediol, 1,4-cyclohexanediol, 1,2-cyclohexanedimethanol, 1,3-cyclohexanedimethanol, 2,2,4,4-tetramethyl 1,3-cyclobutane diol, Z,8-bis(hydroxymethyltricyclo-[5.2.1.0]-decane wherein Z represents 3, 4, or 5; 1,4-bis(2-hydroxyethoxy)benzene, 4,4'-bis(2-hydroxyethoxy) diphenylether [bis-hydroxyethyl bisphenol A], 4,4'-Bis(2-hydroxyethoxy)diphenylsulfide [bis-hydroxyethyl bisphenol S] and diols containing one or more oxygen atoms in the chain, e.g., diethylene glycol, triethylene glycol, dipropylene glycol, tripropylene glycol, etc. In general, these diols contain 2 to 18, and in some embodiments, 2 to 8 carbon atoms. Cycloaliphatic diols can be employed in their cis- or trans-configuration or as mixtures of both forms.

Polyarylene sulfides are also suitable semi-crystalline aromatic polymers. The polyarylene sulfide may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

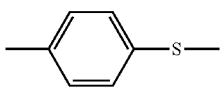

and segments having the structure of formula:

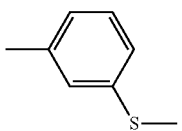

or segments having the structure of formula:

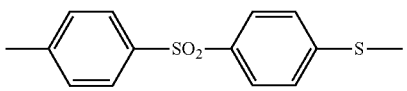

The polyarylene sulfide may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

In addition to the polymers referenced above, crystalline polymers may also be employed in the polymer composition. Particularly suitable are liquid crystalline polymers, which have a high degree of crystallinity that enables them to effectively fill the small spaces of a mold. Liquid crystalline polymers are generally classified as "thermotropic" to the extent that they can possess a rod-like structure and exhibit a crystalline behavior in their molten state (e.g., thermotropic nematic state). The polymers have a relatively high melting temperature, such as from about 250° C. to about 400° C., in some embodiments from about 280° C. to about 390° C., and in some embodiments, from about 300° C. to about 380° C. Such polymers may be formed from one or more types of repeating units as is known in the art. A liquid crystalline polymer may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. The aromatic ester repeating units may be generally represented by the following Formula (I):

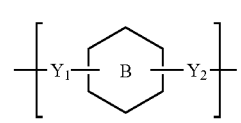

(I)

wherein,
ring B is a substituted or unsubstituted 6-membered aryl group (e.g., 1,4-phenylene or 1,3-phenylene), a substituted or unsubstituted 6-membered aryl group fused to a substituted or unsubstituted 5- or 6-membered aryl group (e.g., 2,6-naphthalene), or a substituted or unsubstituted 6-membered aryl group linked to a substituted or unsubstituted 5- or 6-membered aryl group (e.g., 4,4-biphenylene); and $Y_1$ and $Y_2$ are independently O, C(O), NH, C(O)HN, or NHC(O).

Typically, at least one of $Y_1$ and $Y_2$ are C(O). Examples of such aromatic ester repeating units may include, for instance, aromatic dicarboxylic repeating units ($Y_1$ and $Y_2$ in Formula I are C(O)), aromatic hydroxycarboxylic repeating units ($Y_1$ is O and $Y_2$ is C(O) in Formula I), as well as various combinations thereof.

Aromatic dicarboxylic repeating units, for instance, may be employed that are derived from aromatic dicarboxylic acids, such as terephthalic acid, isophthalic acid, 2,6-naphthalenedicarboxylic acid, diphenyl ether-4,4'-dicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenyl)butane, bis(4-carboxyphenyl)ethane, bis(3-carboxyphenyl)ether, bis(3-carboxyphenyl)ethane, etc., as well as alkyl, alkoxy, aryl and halogen substituents thereof, and combinations thereof. Particularly suitable aromatic dicarboxylic acids may include, for instance, terephthalic acid ("TA"), isophthalic acid ("IA"), and 2,6-naphthalenedicarboxylic acid ("NDA"). When employed, repeating units derived from aromatic dicarboxylic acids (e.g., IA, TA, and/or NDA) typically constitute from about 5 mol. % to about 60 mol. %, in some embodiments from about 10 mol. % to about 55 mol. %, and in some embodiments, from about 15 mol. % to about 50% of the polymer.

Aromatic hydroxycarboxylic repeating units may also be employed that are derived from aromatic hydroxycarboxylic acids, such as, 4-hydroxybenzoic acid; 4-hydroxy-4'-biphenylcarboxylic acid; 2-hydroxy-6-naphthoic acid; 2-hydroxy-5-naphthoic acid; 3-hydroxy-2-naphthoic acid; 2-hydroxy-3-naphthoic acid; 4'-hydroxyphenyl-4-benzoic acid; 3'-hydroxyphenyl-4-benzoic acid; 4'-hydroxyphenyl-3-benzoic acid, etc., as well as alkyl, alkoxy, aryl and halogen substituents thereof, and combination thereof. Particularly suitable aromatic hydroxycarboxylic acids are 4-hydroxybenzoic acid ("NBA") and 6-hydroxy-2-naphthoic acid ("HNA"). When employed, repeating units derived from hydroxycarboxylic acids (e.g., HBA and/or HNA) typically constitute from about 10 mol. % to about 85 mol. %, in some embodiments from about 20 mol. % to about 80 mol. %, and in some embodiments, from about 25 mol. % to about 75 mol. % of the polymer.

Other repeating units may also be employed in the polymer. In certain embodiments, for instance, repeating units may be employed that are derived from aromatic diols, such as hydroquinone, resorcinol, 2,6-dihydroxynaphthalene, 2,7-dihydroxynaphthalene, 1,6-dihydroxynaphthalene, 4,4'-dihydroxybiphenyl (or 4,4'-biphenol), 3,3'-dihydroxybiphenyl, 3,4'-dihydroxybiphenyl, 4,4'-dihydroxybiphenyl ether, bis(4-hydroxyphenyl)ethane, etc., as well as alkyl, alkoxy, aryl and halogen substituents thereof, and combinations thereof. Particularly suitable aromatic diols may include, for instance, hydroquinone ("HQ") and 4,4'-biphenol ("BP"). When employed, repeating units derived from aromatic diols (e.g., HQ and/or BP) typically constitute from about 1 mol. % to about 30 mol. %, in some embodiments from about 2 mol. % to about 25 mol. %, and in some embodiments, from about 5 mol. % to about 20 mol. % of the polymer. Repeating units may also be employed, such as those derived from aromatic amides (e.g., acetaminophen ("APAP")) and/or aromatic amines (e.g., 4-aminophenol ("AP"), 3-aminophenol, 1,4-phenylenediamine, 1,3-phenylenediamine, etc.). When employed, repeating units derived from aromatic amides (e.g., APAP) and/or aromatic amines (e.g., AP) typically constitute from about 0.1 mol. % to about 20 mol. %, in some embodiments from about 0.5 mol. % to about 15 mol. %, and in some embodiments, from about 1 mol. % to about 10 mol. % of the polymer. It should also be understood that various other monomeric repeating units may be incorporated into the polymer. For instance, in certain embodiments, the polymer may contain one or more repeating units derived from non-aromatic monomers, such as aliphatic or cycloaliphatic hydroxycarboxylic acids, dicarboxylic acids, diols, amides, amines, etc. Of course, in other embodiments, the polymer may be "wholly aromatic" in that it lacks repeating units derived from non-aromatic (e.g., aliphatic or cycloaliphatic) monomers.

Although not necessarily required, the liquid crystalline polymer may be a "low naphthenic" polymer to the extent that it contains a minimal content of repeating units derived from naphthenic hydroxycarboxylic acids and naphthenic dicarboxylic acids, such as naphthalene-2,6-dicarboxylic acid ("NDA"), 6-hydroxy-2-naphthoic acid ("HNA"), or combinations thereof. That is, the total amount of repeating units derived from naphthenic hydroxycarboxylic and/or dicarboxylic acids (e.g., NDA, HNA, or a combination of HNA and NDA) is typically no more than 30 mol. %, in some embodiments no more than about 15 mol. %, in some embodiments no more than about 10 mol. %, in some embodiments no more than about 8 mol. %, and in some embodiments, from 0 mol. % to about 5 mol. % of the polymer (e.g., 0 mol. %). Despite the absence of a high level of conventional naphthenic acids, it is believed that the resulting "low naphthenic" polymers are still capable of exhibiting good thermal and mechanical properties.

In one particular embodiment, the liquid crystalline polymer may be formed from repeating units derived from 4-hydroxybenzoic acid ("NBA") and terephthalic acid ("TA") and/or isophthalic acid ("IA"), as well as various other optional constituents. The repeating units derived from 4-hydroxybenzoic acid ("NBA") may constitute from about 10 mol. % to about 80 mol. %, in some embodiments from about 30 mol. % to about 75 mol. %, and in some embodiments, from about 45 mol. % to about 70 mol. % of the polymer. The repeating units derived from terephthalic acid ("TA") and/or isophthalic acid ("IA") may likewise constitute from about 5 mol. % to about 40 mol. %, in some embodiments from about 10 mol. % to about 35 mol. %, and in some embodiments, from about 15 mol. % to about 35 mol. % of the polymer. Repeating units may also be employed that are derived from 4,4'-biphenol ("BP") and/or hydroquinone ("HQ") in an amount from about 1 mol. % to about 30 mol. %, in some embodiments from about 2 mol. % to about 25 mol. %, and in some embodiments, from about 5 mol. % to about 20 mol. % of the polymer. Other possible repeating units may include those derived from 6-hydroxy-2-naphthoic acid ("HNA"), 2,6-naphthalenedicarboxylic acid ("NDA"), and/or acetaminophen ("APAP"). In certain embodiments, for example, repeating units derived from HNA, NDA, and/or APAP may each constitute from about 1 mol. % to about 35 mol. %, in some embodiments from about 2 mol. % to about 30 mol. %, and in some embodiments, from about 3 mol. % to about 25 mol. % when employed.

In certain embodiments, it may desirable to employ a blend of polymers within the polymer matrix. For instance, the polymer matrix may contain a first aromatic polymer that has a faster crystallization rate than a second aromatic polymer. In one embodiment, the first aromatic polymer may include a polyethylene terephthalate and the second aromatic polymer may include a polybutylene terephthalate polymer. Combining aromatic polymers with different crystallization rates may provide various advantages and benefits. For instance, a slower crystallizing polymer (e.g., polybutylene terephthalate) can have a tendency to migrate to the surface of a part and provide good surface gloss and aesthetics, while a faster crystallizing polymer (e.g., polyethylene terephthalate) can enhance mechanical properties. When such a blend is employed, it is typically desired that the first polymer is present in an amount greater than the second polymer. For example, the weight ratio of the first polymer to the second polymer may be from about 1 to about 20, in some embodiments from about 2 to about 15, and in some embodiments, from about 3 to about 10. The first polymer may, for instance, constitute from about 10 wt. % to about 40 wt. %, in some embodiments from about 15 wt. % to about 35 wt. %, and in some embodiments, from about 20 wt. % to about 30 wt. %, while the second polymer may constitute from about 1 wt. % to about 10 wt. %, in some embodiments from about 2 wt. % to about 9 wt. %, and in some embodiments, from about 3 wt. % to about 8 wt. % of the polymer composition.

B. Flake-Shaped Mineral Particles

As indicated above, the polymer composition contains a plurality of flake-shaped mineral particles to help achieve the desired combination of thermal conductivity and mechanical properties. The particles generally have a relatively high aspect ratio (e.g., average diameter divided by average thickness), such as about 4 or more, in some embodiments about 8 or more, and in some embodiments, from about 10 to about 500. The average diameter of the particles may, for example, range from about 5 micrometers to about 200 micrometers, in some embodiments from about 8 micrometers to about 150 micrometers, and in some embodiments, from about 10 micrometers to about 100 micrometers. The average thickness may likewise be about 2 micrometers or less, in some embodiments from about 5 nanometers to about 1 micrometer, and in some embodiments, from about 20 nanometers to about 500 nanometers. The flake-shaped particles are typically formed from a natural and/or synthetic silicate mineral, such as mica, halloysite, kaolinite, illite, montmorillonite, vermiculite, palygorskite, pyrophyllite, calcium silicate, aluminum silicate, wollastonite, etc. Mica, for instance, is particularly suitable. Any form of mica may generally be employed, including, for instance, muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_{2-3}(AlSi_3)O_{10}(OH)_2$), glauconite ($(K,Na)(Al,Mg,Fe)_2(Si,Al)_4O_{10}(OH)_2$), etc. Muscovite-based mica is particularly suitable for use in the polymer composition.

C. Mineral Whiskers

The polymer composition also contains a plurality of mineral fibers (also known as "whiskers"). Examples of such mineral fibers include those that are derived from silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Particularly suitable are inosilicates, such as wollastonite fibers available from Nyco Minerals under the trade designation NYGLOS® (e.g., NYGLOS® 4W or NYGLOS® 8).

The mineral fibers may have a median width (e.g., diameter) of from about 1 to about 35 micrometers, in some embodiments from about 2 to about 20 micrometers, in some embodiments from about 3 to about 15 micrometers, and in some embodiments, from about 7 to about 12 micrometers. The mineral fibers may also have a narrow size distribution. That is, at least about 60% by volume of the fibers, in some embodiments at least about 70% by volume of the fibers, and in some embodiments, at least about 80% by volume of the fibers may have a size within the ranges noted above. Without intending to be limited by theory, it is believed that mineral fibers having the size characteristics noted above can more readily move through molding equipment, which enhances the distribution within the polymer matrix and minimizes the creation of surface defects. In addition to possessing the size characteristics noted above, the mineral fibers may also have a relatively high aspect ratio (average length divided by median width) to help further improve the mechanical properties and surface quality of the resulting polymer composition. For example, the mineral fibers may have an aspect ratio of from about 2 to about 100, in some embodiments from about 2 to about 50, in some embodiments from about 3 to about 20, and in some embodiments, from about 4 to about 15. The volume average length of such mineral fibers may, for example, range from about 1 to about 200 micrometers, in some embodiments from about 2 to about 150 micrometers, in some embodiments from about 5 to about 100 micrometers, and in some embodiments, from about 10 to about 50 micrometers.

D. Reinforcing Fibers

Reinforcing fibers may also be employed to help improve the mechanical properties. When employed, such reinforcing fibers are typically employed in an amount from about 1 to about 60 parts, in some embodiments from about 5 parts to about 50 parts, and in some embodiments, from about 10 to about 40 parts by weight per 100 parts by weight of the polymer matrix employed in the composition. For example, the reinforcing fibers may constitute from about from about 1 wt. % to about 20 wt. %, in some embodiments from about 2 wt. % to about 18 wt. %, and in some embodiments, from about 5 wt. % to about 15 wt. % of the polymer composition. To help maintain an insulative property, which is often desirable for use in electronic components, the reinforcing fibers may be formed from materials that are also generally insulative in nature, such as glass, ceramics (e.g., alumina or silica), aramids (e.g., Kevlar®), polyolefins, polyesters, etc., as well as mixtures thereof. Glass fibers are particularly suitable, such as E-glass, A-glass, C-glass, D-glass, AR-glass, R-glass, S1-glass, S2-glass, etc., and mixtures thereof. The volume average length of the fibers may be from about 1 to about 400 micrometers, in some embodiments from about 50 to about 400 micrometers, in some embodiments from about 80 to about 250 micrometers, in some embodiments from about 100 to about 200 micrometers, and in some embodiments, from about 110 to about 180 micrometers. The fibers may also have an average diameter of about 10 to about 35 micrometers, and in some embodiments, from about 15 to about 30 micrometers. When employed, the reinforcing fibers typically constitute from about 1 wt. % to about 25 wt. %, in some embodiments from about 2 wt. % to about 20 wt. %, and in some embodiments, from about 5 wt. % to about 15 wt. % of the composition.

E. Other Components

A wide variety of additional additives can also be included in the polymer composition, such as lubricants, nucleating agents, coupling agents, pigments, antioxidants, UV stabilizers, surfactants, waxes, flame retardants, anti-drip additives, additional polymers, and other materials added to enhance properties and processability. For example, the composition may include a nucleating agent in an amount from about 0.1 to about 5 parts, in some embodiments from about 0.2 parts to about 3 parts, and in some embodiments, from about 0.3 to about 2 parts by weight per 100 parts by weight of the polymer matrix employed in the composition. For example, the nucleating agent may constitute from about from about 0.01 wt. % to about 5 wt. %, in some embodiments from about 0.05 wt. % to about 2 wt. %, and in some embodiments, from about 0.1 wt. % to about 1 wt. % of the polymer composition. Suitable nucleating agents may include, for instance, a salt (e.g., sodium salt) of a dicarboxylic acid, such as sodium terephthalates, sodium naphthalene dicarboxylates, and sodium isophthalates. Suitable nucleating agents also include a salt (e.g., sodium salt) of a $C_{10}$ to $C_{36}$ monofunctional organic acid, and in some embodiments, $C_{30}$ to $C_{36}$ monofunctional organic acid, such as sodium stearate, sodium behenate, sodium erucate, sodium palmitate, sodium montanate, or combinations thereof. An example of such a nucleating agent is a sodium salt of montanic acid, commercially available under the tradename Licomont™ NaV101 from Clariant.

Lubricants may also be employed, such as polyolefin waxes (e.g., polyethylene wax), amide waxes, fatty acid ester waxes, etc. Such waxes typically constitute from about 0.1 to about 20 parts, in some embodiments from about 0.4 to about 10 parts, and in some embodiments, from about 0.5 to about 5 parts per 100 parts of the polymer matrix employed in the composition. Fatty acid ester waxes may, for instance, be obtained by oxidative bleaching of a crude natural wax and subsequent esterification of the fatty acids with an alcohol. The alcohol typically has 1 to 4 hydroxyl groups and 2 to 20 carbon atoms. When the alcohol is multifunctional (e.g., 2 to 4 hydroxyl groups), a carbon atom number of 2 to 8 is particularly desired. Particularly suitable multifunctional alcohols may include dihydric alcohol (e.g., ethylene glycol, propylene glycol, butylene glycol, 1,3-propanediol, 1,4-butanediol, 1,6-hexanediol and 1,4-cyclohexanediol), trihydric alcohol (e.g., glycerol and trimethylolpropane), tetrahydric alcohols (e.g., pentaerythritol and erythritol), and so forth. Aromatic alcohols may also be suitable, such as o-, m- and p-tolylcarbinol, chlorobenzyl alcohol, bromobenzyl alcohol, 2,4-dimethylbenzyl alcohol, 3,5-dimethylbenzyl alcohol, 2,3,5-cumobenzyl alcohol, 3,4, 5-trimethylbenzyl alcohol, p-cuminyl alcohol, 1,2-phthalyl alcohol, 1,3-bis(hydroxymethyl)benzene, 1,4-bis(hydroxymethyl)benzene, pseudocumenyl glycol, mesitylene glycol and mesitylene glycerol. Particularly suitable fatty acid esters for use in the present invention are derived from montanic waxes. Licowax® OP (Clariant), for instance, contains montanic acids partially esterified with butylene glycol and montanic acids partially saponified with calcium hydroxide. Thus, Licowax® OP contains a mixture of montanic acid esters and calcium montanate. Other montanic acid esters that may be employed include Licowax® E, Licowax® OP, and Licolub® WE 4 (all from Clariant), for instance, are montanic esters obtained as secondary products from the oxidative refining of raw montan wax. Licowax® E and Licolub® WE 4 contain montanic acids esterified with ethylene glycol or glycerine.

Yet another suitable lubricant may be a siloxane polymer that improves internal lubrication and that also helps to bolster the wear and friction properties of the composition encountering another surface. Such siloxane polymers typically constitute from about 0.2 to about 20 parts, in some embodiments from about 0.5 to about 10 parts, and in some embodiments, from about 0.8 to about 5 parts per 100 parts of the polymer matrix employed in the composition. Any of a variety of siloxane polymers may generally be employed. The siloxane polymer may, for instance, encompass any polymer, co-polymer or oligomer that includes siloxane units in the backbone having the formula:

$$R_r SiO_{(4-r/2)}$$

wherein
R is independently hydrogen or substituted or unsubstituted hydrocarbon radicals, and
r is 0, 1, 2 or 3.

Some examples of suitable radicals R include, for instance, alkyl, aryl, alkylaryl, alkenyl or alkynyl, or cycloalkyl groups, optionally substituted, and which may be interrupted by heteroatoms, i.e., may contain heteroatom(s) in the carbon chains or rings. Suitable alkyl radicals, may include, for instance, methyl, ethyl, n-propyl, isopropyl, n-butyl, isobutyl, tert-butyl, n-pentyl, isopentyl, neopentyl and tert-pentyl radicals, hexyl radicals (e.g., n-hexyl), heptyl radicals (e.g., n-heptyl), octyl radicals (e.g., n-octyl), isooctyl radicals (e.g., 2,2,4-trimethylpentyl radical), nonyl radicals (e.g., n-nonyl), decyl radicals (e.g., n-decyl), dodecyl radicals (e.g., n-dodecyl), octadecyl radicals (e.g., n-octadecyl), and so forth. Likewise, suitable cycloalkyl radicals may include cyclopentyl, cyclohexyl cycloheptyl radicals, methylcyclohexyl radicals, and so forth; suitable aryl radicals may include phenyl, biphenyl, naphthyl, anthryl, and phenanthryl radicals; suitable alkylaryl radicals may include o-, m- or p-tolyl radicals, xylyl radicals, ethylphenyl radicals, and so forth; and suitable alkenyl or alkynyl radicals may include vinyl, 1-propenyl, 1-butenyl, 1-pentenyl, 5-hexenyl, butadienyl, hexadienyl, cyclopentenyl, cyclopentadienyl, cyclohexenyl, ethynyl, propargyl 1-propynyl, and so forth. Examples of substituted hydrocarbon radicals are halogenated alkyl radicals (e.g., 3-chloropropyl, 3,3,3-trifluoropropyl, and perfluorohexylethyl) and halogenated aryl radicals (e.g., p-chlorophenyl and p-chlorobenzyl). In one particular embodiment, the siloxane polymer includes alkyl radicals (e.g., methyl radicals) bonded to at least 70 mol % of the Si atoms and optionally vinyl and/or phenyl radicals bonded to from 0.001 to 30 mol % of the Si atoms. The siloxane polymer is also preferably composed predominantly of diorganosiloxane units. The end groups of the polyorganosiloxanes may be trialkylsiloxy groups, in particular the trimethylsiloxy radical or the dimethylvinylsiloxy radical. However, it is also possible for one or more of these alkyl groups to have been replaced by hydroxy groups or alkoxy groups, such as methoxy or ethoxy radicals. Particularly suitable examples of the siloxane polymer include, for instance, dimethylpolysiloxane, phenylmethylpolysiloxane, vinylmethylpolysiloxane, and trifluoropropylpolysiloxane.

The siloxane polymer may also include a reactive functionality on at least a portion of the siloxane monomer units of the polymer, such as one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoximate groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), aminoxy groups (e.g., dimethylaminoxy and diethylaminoxy), mercapto groups, etc.

Regardless of its particular structure, the siloxane polymer typically has a relatively high molecular weight, which reduces the likelihood that it migrates or diffuses to the surface of the polymer composition and thus further minimizes the likelihood of phase separation. For instance, the siloxane polymer typically has a weight average molecular weight of about 100,000 grams per mole or more, in some embodiments about 200,000 grams per mole or more, and in some embodiments, from about 500,000 grams per mole to about 2,000,000 grams per mole. The siloxane polymer may also have a relative high kinematic viscosity, such as about 10,000 centistokes or more, in some embodiments about 30,000 centistokes or more, and in some embodiments, from about 50,000 to about 500,000 centistokes.

If desired, silica particles (e.g., fumed silica) may also be employed in combination with the siloxane polymer to help improve its ability to be dispersed within the composition. Such silica particles may, for instance, have a particle size of from about 5 nanometers to about 50 nanometers, a surface area of from about 50 square meters per gram ($m^2/g$) to about 600 $m^2/g$, and/or a density of from about 160 kilogram per cubic meter ($kg/m^3$) to about 190 $kg/m^3$. When employed, the silica particles typically constitute from about 1 to about 100 parts, and in some some embodiments, from about 20 to about 60 parts by weight based on 100 parts by weight of the siloxane polymer. In one embodiment, the silica particles can be combined with the siloxane polymer prior to addition of this mixture to the polymer composition. For instance a mixture including an ultrahigh molecular weight polydimethylsiloxane and fumed silica can be incorporated in the polymer composition. Such a pre-formed mixture is available as Genioplast® Pellet S from Wacker Chemie, AG.

II. Formation

The polymer matrix, flake-shaped mineral particles, mineral whiskers, and other optional additives may be melt processed or blended together. The components may be supplied separately or in combination to an extruder that includes at least one screw rotatably mounted and received within a barrel (e.g., cylindrical barrel) and may define a feed section and a melting section located downstream from the feed section along the length of the screw. It is typically desired to minimize the number of distributive and/or dispersive mixing elements that are employed within the mixing and/or melting sections of the extruder. The mineral particles and/or whiskers may be added a location downstream from the point at which the polymer(s) are supplied (e.g., hopper). The mineral particles and/or whiskers may also be supplied to the extruder at a location downstream from the polymer(s). One or more of the sections of the extruder are typically heated, such as within a temperature range of from about 200° C. to about 450° C., in some embodiments, from about 210° C. to about 350° C., and in some embodiments, from about 220° C. to about 350° C. to form the composition. The speed of the screw may be selected to achieve the desired residence time, shear rate, melt processing temperature, etc. For example, the screw speed may range from about 50 to about 800 revolutions per minute ("rpm"), in some embodiments from about 70 to about 150 rpm, and in some embodiments, from about 80 to about 120 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("$m^3/s$") of the polymer melt and R is the radius ("m") of the capillary (e.g., extruder die) through which the melted polymer flows.

Regardless of the particular manner in which it is formed, the present inventor has discovered that the resulting polymer composition can possess excellent thermal properties. For example, the melt viscosity of the polymer composition may be low enough so that it can readily flow into the cavity of a mold having small dimensions. In one particular embodiment, the polymer composition may have a melt viscosity of from about 10 to about 600 Pascal-seconds ("Pa-s"), in some embodiments from about 40 to about 300 Pa-s, and in some embodiments, from about 50 to about 200 Pa-s, determined at a shear rate of 1000 seconds$^{-1}$. Melt viscosity may be determined in accordance with ISO Test No. 11443:2005 at a temperature that is at least about 15° C. higher than the melting temperature of the composition (e.g., 300° C.).

III. Shaped Parts

Once formed, the polymer composition may be shaped into a part for use in a wide variety of different applications. Such parts may be formed using a variety of different processes, such as by molding (e.g., injection molding, compression molding, etc.), casting, thermoforming, etc. For example, the shaped part may be molded using a one-component injection molding process in which granules formed from the polymer composition are injected into a mold, shaped, and thereafter cooled.

In one particular embodiment, for instance, the polymer composition may be used to form a "heat sink" that is capable of removing, conducting, and/or absorbing heat from another part or surface. The design and shape of the resulting heat sink may vary as is known in the art and can depend upon a variety of different factors, such as the specific application, the degree of heat transfer needed, the location of the heat sink, and the amount of available space. In one embodiment, for example, the heat sink may contain a plurality of spaced apart heat-dissipating elements (e.g., fins, fibers, etc.) that increase the overall surface area of the heat skin. The number of heat-dissipating elements may vary, but is typically from 2 to 20, in some embodiments from 4 to 18, and in some embodiments, from 6 to 16. The height of the heat-dissipating elements is typically from about 1 to about 100 millimeters, in some embodiments from about 2 to about 60 millimeters, and in some embodiments, from about 5 to about 40 millimeters. The heat-dissipating elements may project outwardly from a base, which may be generally planar and have any shape desired, such as rectangular, square, circular, etc. The direction that the elements extend from the base may vary as desired, such as perpendicular to a major surface of the base, radially from the base, etc. In addition to being used to form a heat sink, the polymer composition of the present invention may also be formed into other types of shaped parts, such as a housing for a light source (e.g., light emitting diode ("LED")) for a light a tunnel light, headlamp, etc., or other electronic equipment, such as used in computers, phones, electronic control units, etc. Such thermally conductive heat sinks and/or housing structures may be particularly useful in vehicles (e.g., automobiles, buses, motorcycles, boats, etc.), such as an electric vehicle (EV), a hybrid electric vehicle (HEV), a plug-in hybrid electric vehicle (PHEV), or other type of vehicle using electric power for propulsion (collectively referred to as "electric vehicles").

Referring to FIG. 1, for example, one particular embodiment of a light assembly 42 that may contain the polymer composition of the present invention is shown. In the illustrated embodiment, the light assembly 42 contains a heat sink 18, which has a base from which a plurality of heat-radiating elements 50 (e.g., fins) project in a direction perpendicular to a major surface of the base to define a height "I." If desired, any portion of the heat sink 18 (e.g., fins and/or base) may be formed from the polymer composition of the present invention. The heat sink 18 is disposed external to an outer housing 26 of a light assembly 26, within which is mounted an LED module 12. If desired, any portion of the housing 26 may be formed from the polymer composition of the present invention. A connector 20 may also be attached at one end 22 of the heat sink 18 and at another end 24 to the LED module 12, and configured to conduct heat away from the LED module 12 and to the heat sink 18. The connector 20 may be attached using a securing device 58, such as a snap, rivet, bolt, screw, clamp, stud, weld, braze, solder, adhesive, etc. The connector 20 and/or securing device 58 may also be thermally conductive and may be formed from a metal or a thermally conductive polymer composition, such as described herein. Of course, the heat sink 18 may also be attached directly to the housing 26 or LED module 12, or may even be formed integrally with such components. The LED module 12 may contain one or more light emitting diodes 36 (e.g., two), which can be located on a substrate 38. A LED circuit 44 is also positioned on the substrate 38. A reflector 48 assists in directing light from the LED module in the desired direction. The reflector 48 may include a shell 34 with a reflective coating on an inner surface thereof, such as a metallic coating. Current can be supplied to the LED module 12 from the battery of the vehicle to cause the diodes 36 to emit light, which then passes through a lens 54 and projected outwardly from the light assembly 16 by the reflector 48. As the LED emits light, it also creates heat, which can be removed by the heat sink 18.

The present invention may be better understood with reference to the following examples.

Test Methods

Thermal Conductivity: In-plane and through-plane thermal conductivity values are determined in accordance with ASTM E1461-13.

Specific Gravity: Specific gravity may be determined in accordance with ISO 1183-1:2012.

Melt Viscosity: The melt viscosity (Pa-s) may be determined in accordance with ISO Test No. 11443:2005, such as with a Dynisco LCR7001 capillary rheometer. The rheometer orifice (die) may, for example, have a diameter of 1 mm, length of 20 mm, L/D ratio of 20:1, and an entrance angle of 180°. The diameter of the barrel was 9.55 mm+0.005 mm and the length of the rod was 233.4 mm. The melt viscosity is typically determined at a temperature at least 15° C. above the melting temperature (e.g., 300° C.) and at a shear rate of 400 $s^{-1}$ or 1,200 $s^{-1}$.

Glass Transition and Melting Temperatures: The glass transition temperature ("Tg") and melting temperature ("Tm") may be determined by differential scanning calorimetry ("DSC") as is known in the art. For semi-crystalline and crystalline materials, the melting temperature is the differential scanning calorimetry (DSC) peak melt temperature as determined by ISO Test No. 11357-2:2016. Under the DSC procedure, samples were heated and cooled at 20° C. per minute as stated in ISO Standard.

Tensile Properties: Tensile properties may be tested according to ISO Test No. 527:2012 (technically equivalent to ASTM D638-14). The test strip sample may have a length of 80 mm, thickness of 10 mm, and width of 4 mm. The testing temperature may be 23° C., and the testing speeds may be 1 or 5 mm/min.

Flexural Properties: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Unotched and Notched Charpy Impact Strength: Charpy properties may be tested according to ISO Test No. ISO 179-1:2010) (technically equivalent to ASTM D256-10, Method B). This test may be run using a Type 1 specimen size (length of 80 mm, width of 10 mm, and thickness of 4 mm). When testing the notched impact strength, the notch may be a Type A notch (0.25 mm base radius). Specimens may be cut from the center of a multi-purpose bar using a single tooth milling machine. The testing temperature may be 23° C. or −30° C.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Example 1

A polymer composition was formed from a blend of 28.6 wt. % polyethylene terephthalate (Adante™ 13006), 5 wt. % polybutylene terephthalate (Celanex® 2020 ED3002K40), 10 wt. % glass fibers (Owens Corning), 10 wt. % mica, 45 wt. % wollastonite fibers (Nyglos™ 8), 1 wt. % pelletized silicone (Genioplast™ Pellet S), 0.2 wt. % polyethylene wax (Licolub™ H12), and 0.2 wt. % nucleating agent (Licomont™ Nay 101).

Example 2

A polymer composition was formed from a blend of 24.6 wt. % polyethylene terephthalate (Adante™ 13006), 5 wt. % polybutylene terephthalate (Celanex® 2020 ED3002K40), 20 wt. % mica, 50 wt. % wollastonite fibers (Nyglos™ 4 W), 0.2 wt. % polyethylene wax (Licolub™ H12), and 0.2 wt. % nucleating agent (Licomont™ Nay 101).

Example 3

A polymer composition was formed from a blend of 24.6 wt. % polyethylene terephthalate (Adante™ 13006), 5 wt. % polybutylene terephthalate (Celanex® 2020 ED3002K40), 10 wt. % glass fibers (Owens Corning), 20 wt. % mica, 40 wt. % wollastonite fibers (Nyglos™ 4 W), 0.2 wt. % polyethylene wax (Licolub™ H12), and 0.2 wt. % nucleating agent (Licomont™ Nay 101).

Example 4

A polymer composition was formed from a blend of 24.6 wt. % polyethylene terephthalate (Adante™ 13006), 5 wt. % polybutylene terephthalate (Celanex® 2020 ED3002K40), 10 wt. % glass fibers (Owens Corning), 20 wt. % mica, 40 wt. % wollastonite fibers (Nyglos™ 4 W with sizing), 0.2 wt. % polyethylene wax (Licolub™ H12), and 0.2 wt. % nucleating agent (Licomont™ Nay 101).

Example 5

A polymer composition was formed from a blend of 24.6 wt. % polyethylene terephthalate (Adante™ 13006), 5 wt. % polybutylene terephthalate (Celanex® 2020 ED3002K40), 10 wt. % glass fibers (Owens Corning), 20 wt. % mica, 40 wt. % wollastonite fibers (Nyglos™ 8), 0.2 wt. % polyethylene wax (Licolub™ H12), and 0.2 wt. % nucleating agent (Licomont™ Nay 101).

Example 6

A polymer composition was formed from a blend of 29.6 wt. % polyethylene terephthalate (Adante™ 13006), 5 wt. % polybutylene terephthalate (Celanex® 2020 ED3002K40), 10 wt. % glass fibers (Owens Corning), 20 wt. % mica, 35 wt. % wollastonite fibers (Nyglos™ 8), 0.2 wt. % polyethylene wax (Licolub™ H12), and 0.2 wt. % nucleating agent (Licomont™ Nay 101).

Example 7

A polymer composition was formed from a blend of 29.6 wt. % polyphenylene sulfide (Fortron® 0203), 5 wt. % liquid crystalline polymer (Vectra® E9500i), 10 wt. % glass fibers (Owens Corning), 10 wt. % mica, 45 wt. % wollastonite fibers (Nyglos™ 8), 0.08 wt. % 3-aminopropyltriethoxysilane, 0.2 wt. % lubricant (Glycolube™ P).

Samples from Examples 1-7 were tested for thermal and mechanical properties, the results of which are provided in the table below.

| Example | 1 | 2 | 3 | 4 | 5 | 6 | 7 |
|---|---|---|---|---|---|---|---|
| In-Plane Thermal Conductivity (W/m-K) | 1.40 | 1.6 | 1.5 | 1.5 | 1.6 | 1.4 | 1.3 |
| Through-Plane Thermal Conductivity (W/m-K) | 0.90 | 1.0 | 1.0 | 0.9 | 1.0 | 0.8 | 0.8 |
| Melt Viscosity at 300° C. and 1,000 s$^{-1}$ (Pa-s) | 189 | 168 | 153 | 116 | 149 | 169 | — |
| Specific Gravity (g/cm$^3$) | 1.8 | 2.2 | — | 2.1 | 2.1 | 2.1 | 2.0 |
| Melting Temperature (1$^{st}$ heat, ° C.) | 247 | 243 | 244 | 243 | 244 | 240 | — |
| DTUL @ 1.8 MPa (° C.) | — | 199 | 224 | 222 | — | — | 270 |
| Charpy Notched (kJ/m$^2$) | 2.1 | 1.4 | 2.5 | 2.9 | 2.5 | 2.4 | 2.5 |
| Charpy Unnotched (kJ/m$^2$) | 16 | — | — | — | — | — | 14 |
| Tensile Strength (MPa) | 92 | 37 | 66 | 66 | 70 | 93 | 112 |
| Tensile Modulus (MPa) | 19,683 | 26,393 | 27,283 | 28,114 | 27,479 | 23,988 | 25,806 |
| Tensile Elongation (%) | 0.65 | 0.13 | 0.24 | 0.21 | 0.26 | 0.45 | 0.53 |
| Flexural Strength (MPa) | 144 | 82 | 114 | 106 | 124 | 158 | 194 |
| Flexural Modulus (MPa) | 19,643 | 29,676 | 29,230 | 29,144 | 28,518 | 24,394 | 25,680 |
| Flexural Elongation (%) | 0.86 | 0.28 | 0.4 | 0.37 | 0.45 | 0.72 | 0.88 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising a polymer matrix within which a plurality of mica particles and wollastonite whiskers are distributed, the wollastonite whiskers being employed in an amount of from about 80 to about 300 parts by weight per 100 parts by weight of the polymer matrix, wherein the polymer composition exhibits an in-plane thermal conductivity of 0.2 W/m-K or more.

2. The polymer composition of claim 1, wherein the composition exhibits a through-plane thermal conductivity of 0.3 W/m-k or more.

3. The polymer composition of claim 1, wherein the composition is free of thermally conductive fillers having an intrinsic conductivity of 50 W/m-K or more.

4. The polymer composition of claim 1, wherein the composition is free of boron nitride, aluminum nitride, magnesium silicon nitride, graphite, silicon carbide, carbon nanotubes, zinc oxide, magnesium oxide, beryllium oxide, zirconium oxide, yttrium oxide, aluminum powder, and copper powder.

5. The polymer composition of claim 1, wherein the composition exhibits a tensile strength of from about 30 to about 300 MPa and/or a tensile modulus of from about 10,000 MPa to about 40,000 MPa, as determined in accordance with ISO Test No. 527-1:2012 at a temperature of 23° C.

6. The polymer composition of claim 1, wherein the composition exhibits a flexural strength of from about 30 to about 500 MPa and/or a flexural modulus of from about 7,000 MPa to about 40,000 MPa, as determined in accordance with ISO Test No. 178:2010 at a temperature of 23° C.

7. The polymer composition of claim 1, wherein the mica particles are employed in an amount from about 1 to about 60 parts by weight per 100 parts by weight of the polymer matrix.

8. The polymer composition of claim 1, wherein the polymer matrix constitutes from about 10 wt. % to about 50 wt. % of the polymer composition.

9. The polymer composition of claim 1, wherein the polymer matrix contains an aromatic polymer having a glass transition temperature of about 40° C. or more.

10. The polymer composition of claim 9, wherein the aromatic polymer has a melting temperature of about 200° C. or more.

11. The polymer composition of claim 1, wherein the polymer matrix contains an aromatic polyester.

12. The polymer composition of claim 11, wherein the polymer matrix includes poly(ethylene terephthalate), poly(1,4-butylene terephthalate), poly(1,3-propylene terephthalate), poly(1,4-butylene 2,6-naphthalate), poly(ethylene 2,6-naphthalate), poly(1,4-cyclohexylene dimethylene terephthalate), or a copolymer or mixtures thereof.

13. The polymer composition of claim 1, wherein the polymer matrix contains a blend of a first aromatic polymer and a second aromatic polymer, wherein the weight ratio of the first aromatic polymer to the second aromatic polymer is from about 1 to about 20.

14. The polymer composition of claim 13, wherein the first aromatic polymer is polyethylene terephthalate and the second aromatic polymer is polybutylene terephthalate.

15. The polymer composition of claim 1, wherein the polymer matrix includes a liquid crystalline polymer.

16. The polymer composition of claim 1, wherein the polymer matrix includes a polyarylene sulfide.

17. The polymer composition of claim 1, wherein the mica particles have an aspect ratio of 4 or more.

18. The polymer composition of claim 1, wherein the wollastonite whiskers have an aspect ratio of from about 2 to about 100.

19. The polymer composition of claim 1, further comprising reinforcing fibers in an amount of from about 1 to about 60 parts by weight per 100 parts by weight of the polymer matrix.

20. The polymer composition of claim 19, wherein the reinforcing fibers include glass fibers.

21. The polymer composition of claim 1, further comprising a nucleating agent in an amount from about 0.1 to about 5 parts by weight per 100 parts by weight of the polymer matrix.

22. The polymer composition of claim 21, wherein the nucleating agent includes a salt of a $C_{10}$ to $C_{36}$ monofunctional organic acid.

23. A heat sink comprising the polymer composition of claim 1.

24. The heat sink of claim 23, wherein the heat sink contains a plurality of spaced apart heat-dissipating elements formed from the polymer composition.

25. The heat sink of claim 24, wherein the heat-dissipating elements are fins.

26. The heat sink of claim 24, wherein the heat-dissipating elements project outwardly from a base, wherein the base is formed from the polymer composition.

27. A housing for an electronic component or light source comprising the polymer composition of claim 1.

28. A light assembly comprising:
    an LED module that contains one or more light emitting diodes;
    a housing that encloses the LED module; and
    a heat sink that is located external to the housing,
    wherein the heat sink, the housing, or both contain the polymer composition of claim 1.

29. The light assembly of claim 28, wherein the heat sink is attached to the LED module through a connector.

30. The light assembly of claim 28, wherein the heat sink is attached to the housing.

* * * * *